May 22, 1951 M. PEGARD 2,554,207
MACHINE TOOL
Filed April 2, 1947 3 Sheets-Sheet 1

May 22, 1951 M. PEGARD 2,554,207
MACHINE TOOL
Filed April 2, 1947 3 Sheets-Sheet 2
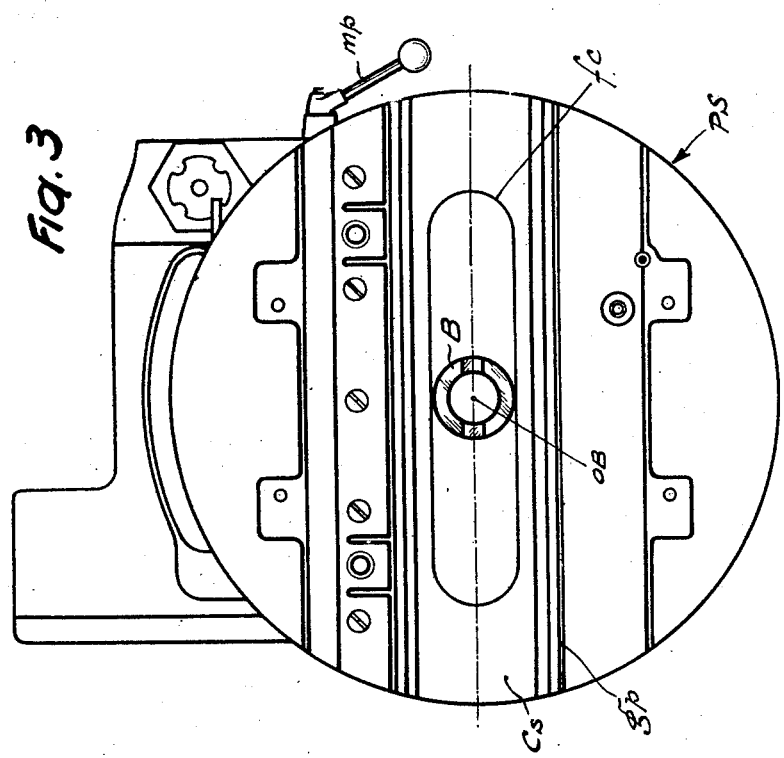
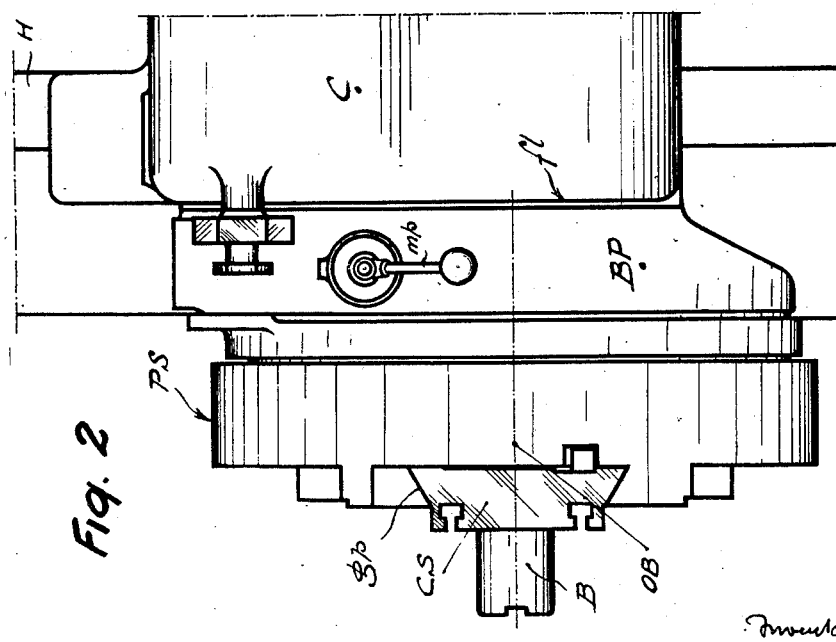
Inventor:
Marcel Pegard

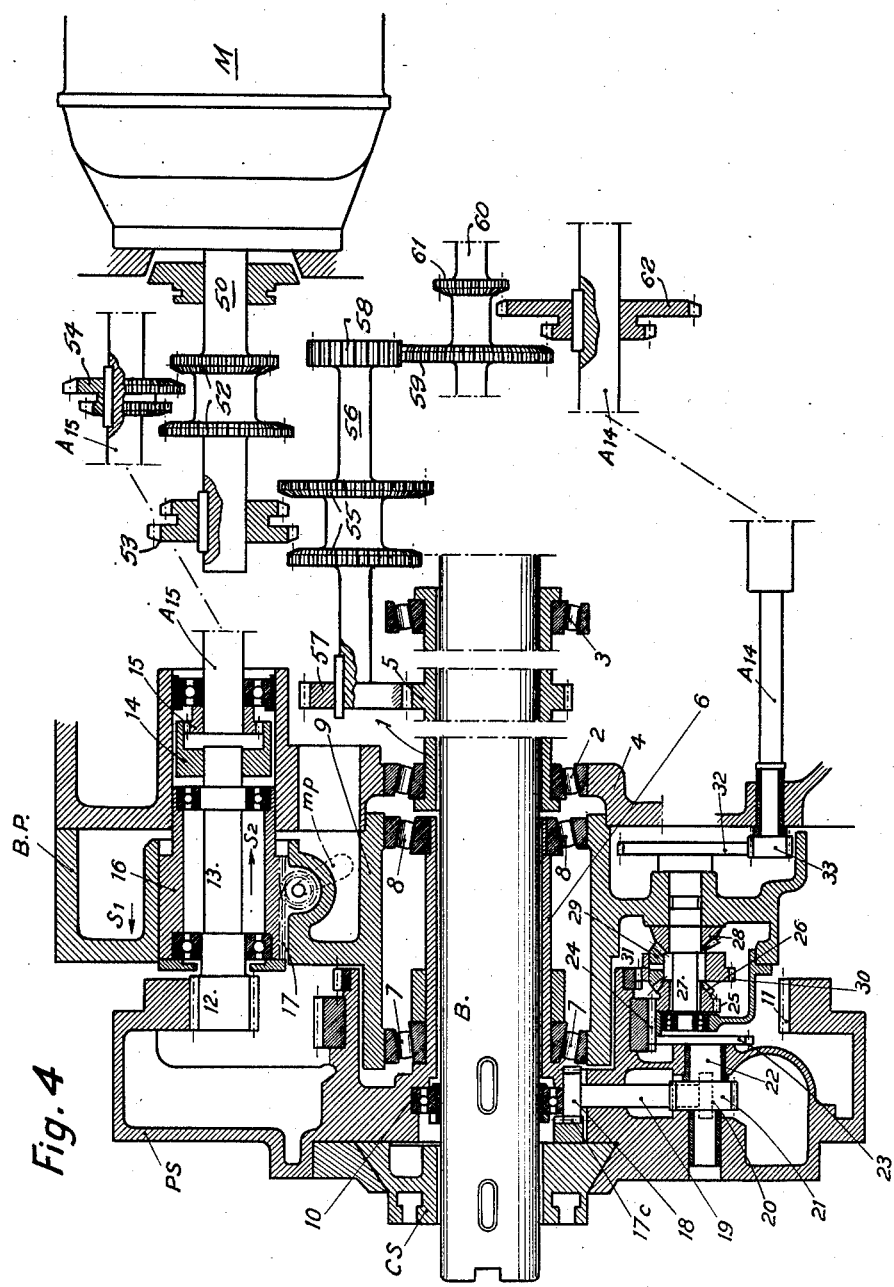

Patented May 22, 1951

2,554,207

UNITED STATES PATENT OFFICE 2,554,207

MACHINE TOOL

Marcel Pegard, Paris, France

Application April 2, 1947, Serial No. 739,028
In France March 2, 1942

Section 1, Public Law 690, August 8, 1946
Patent expires March 2, 1962

6 Claims. (Cl. 82—2)

Some machine-tools, especially drilling-machines, very often include a surfacing plate. It will be called to mind that the operation of such a plate is as follows: at the same time that the plate rotates a slide-bar with which it is furnished is given a radial feed-motion. As a consequence of these two motions the tool describes a spiral on the surface of the part on which work is being done. The surfacing plate is aligned with the same central axis as the spindle of the drilling-machine, and its slide bar includes a longitudinal opening through which the spindle extends while the slide bar moves with reference to the spindle.

With arrangements that have been put into practice so far, the surfacing plate is carried by a sleeve concentric with the revolving spindle and mounted in a frame bearing. Inside this sleeve construction is a ring acting as a support for the spindle.

The consequence of this is that the equipment comprises two concentric guide-ways liable to introduce an excessive amount of play. In addition, the weight of the plate and the thrust of the tools is liable to place too heavy a load on the spindle, thus limiting the accuracy when the spindle and the surfacing plate operate simultaneously.

My invention has for its object in the first place the avoidance of any counter-thrust of the surfacing plate on the spindle. To this end, a primary feature comprises their independent mounting rather than providing concentric guide-ways for the surface plate and spindle.

In a preferred embodiment of my invention, the spindle is slidingly mounted in a sleeve turning in bearings carried by the frame of the carriage body but rotates with this sleeve. The sleeve carries a pinion that is driven by the motor of the machine through the medium of speed changing gear trains so that the spindle may be given the desired speed.

The surfacing plate is carried by a shank rigidly connected thereto and turning in bearings fixed in the plate support.

Through such an arrangement, the thrusts caused by the weight of the plate and by the strains imparted by the tools carried thereby are not transferred to the spindle.

On the other hand, it is important to provide for the operation of the machine with or without the surfacing plate. In accordance with the invention, the plate is set up in such a way that it can be mounted in position or removed easily and quickly. To this end, the bearings of the surfacing plate are carried by a movable casing that can be mounted on a side surface of the spindle-carrying carriage, or taken off at will. Also, within this casing are arranged transmission members providing a turning motion for the plate, as well as control means for the feed motion of the slide. In this way, when the plate is taken off, the control members are withdrawn at the same time, while, when it is fastened to the machine tool by utilising the movable casing mentioned above, it is furnished with all the necessary working parts.

The turning gear of the plate and its feed mechanism are arranged in such a way that the motion of the plate may come from one of the shafts of the spindle-carrying carriage while that of the slide is obtained by means of an extra shaft arranged for this purpose.

The invention is illustrated, but only as an example, in the accompanying drawings wherein:

Figure 2 is a view similar to Fig. 1 showing the surfacing plate incorporated to the spindle-carrying carriage.

Figure 3 shows the structure of Fig. 2 as viewed from the left hand side thereof.

Figure 4 is a sectional view on a larger scale of the plate, its casing, and the included parts.

Figure 1:
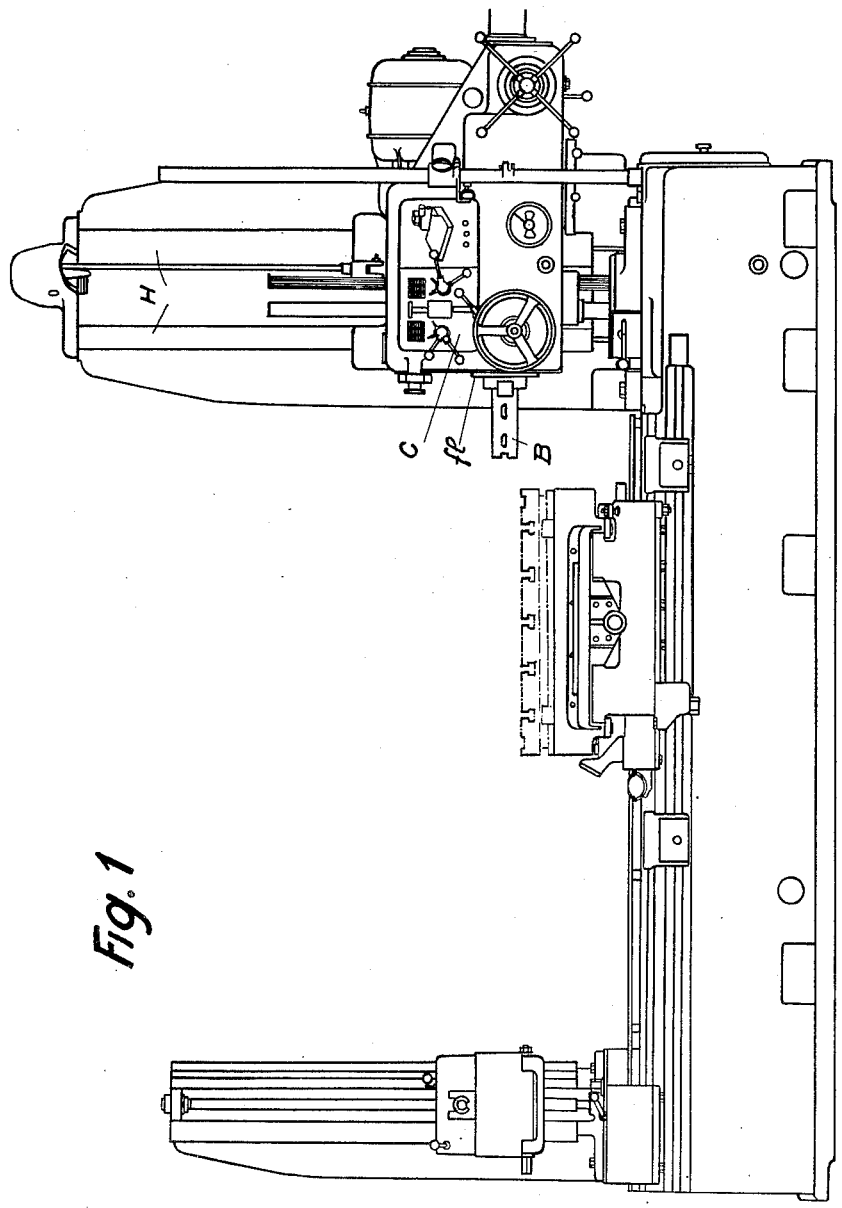
Figure 1 is an elevational view of the drilling-machine without the surfacing plate.

As shown in the drawings, the surfacing plate PS (Figures 2 and 3) is carried by a casing BP that can be fitted (Figure 2) on the side surface $fl$ of the spindle-carrying carriage C. The attachment of this casing is secured by means of screws or of any other fastening means.

The carriage C may move up and down on slide-bars H of the machine frame. The surfacing plate therefore follows it thoughout this sliding motion.

The surfacing plate may rotate round the axis OB of the spindle by means to be described later. It is furnished as usual with a traversing slide $cs$ that can move in the slide ways $gp$ of the plate. This slide includes a longitudinal opening $fc$ through which the spindle B extends. This aperture allows the slide to take its motion with reference to the plate while the spindle B passes through it.

Referring to Figure 4, it will be seen that the spindle B extends through a sleeve $l$, in which it may slide, but these two parts are connected for rotating with by means of splines, through a key, or any other suitable structure. The sleeve $l$ is carried by two bearings 2 and 3 formed by two conical roller bearings with the same outside diameter and the race of which carries a shoulder designed as a stop. These bearings are carried by the frame 4 that is drilled with the greatest care.

Owing to this arrangement the spindle carrier is guided and kept axially alined with a high degree of accuracy.

The sleeve 1 carries on the outside thereof a pinion 5 that is driven by the machine motor through a suitable transmission including a certain number of sliding collars allowing various speeds to be obtained for the pinion 5 and consequently for the spindle.

As may be seen from Fig. 4, the motor M drives shaft 50 on which are mounted the pinions 52 and speed change gears 53. The speed change gears 53 are slidably mounted on the shaft 50 so that they may be meshed with either one of the pinions 55 on the shaft 56. As may be seen at the top of Fig. 4, speed change gears 54 are slidably mounted on shaft A15 so that they may engage with either one of pinions 52. Mounted at one end of shaft 56 is pinion 57 which engages with sleeve 1 so as to drive spindle B. On the other end of shaft 56 is fixedly mounted the pinion 58 which engages with gear 59 on shaft 60. Slidably mounted on shaft A14 is the speed change gear 62 which may mesh with either one of gears 59 or 61 in order to transmit the drive from the motor end to shaft A14. Pinion 57 is slidably mounted on shaft 56.

The plate PS carries a shank 6 set in two bearings 7 and 8 carried by the frame 9 of the casing BP. The plate is thereby mounted independently of the spindle, as well as concentrically thereto.

In order to perfect the guiding of the spindle, a bearing is arranged at 10 constituted by ball-bearings placed between the spindle and the shank 6 of the surfacing plate structure.

The plate PS is rotatively driven round the axis OB in the following way: this plate carries an internally toothed wheel 11; engaged with this gear is a pinion 12 keyed on one end of a spindle 13 which carries on its other end a cup 14 provided with internal teeth adjacent the outer edge thereof. This gearing is engageable with a pinion 15 keyed on a spindle A15 which is permanently revolving and forms part of the transmission included in the carriage C.

The spindle 13 turns in bearings carried by a sleeve 16; the latter carries on the outside a rack 17 which engages with a pinion that may be turned by means of a handle *mp* (Figures 4 and 2).

If the handle *mp* is moved so as to change the position of the sleeve 16 towards the left, i. e. the direction s1, with all its associated gear, so as to bring the parts into the position shown in Figure 4, the internal gearing of cup 14 and the gearing of pinion 15 are in mesh. Consequently, the surfacing plate PS is driven by the spindle A15.

On the other hand, if the handle *mp* is turned so as to move the sleeve 16 towards the right in the direction S2, the gearing of the cup becomes disengaged from the pinion 15 and the plate PS then stops.

As the spindle may be individually controlled so as to be rotated or remain stationary, the following may happen: either the simultaneous turning of plate and spindle or the turning of the plate alone or the turning only of the spindle.

The feed motion of the traversing slide is obtained as follows: This slide CS carries a rack 17c (Figure 4) engaging a pinion 18. The latter is keyed on the shaft 19 to which is keyed likewise a worm wheel 20, which latter engages the worm 21 keyed to a shaft 22 carrying a pinion 23. The latter is in engagement with a wheel 24 freely mounted concentrically with the axis of the spindle carrier, and engaged with this wheel is a pinion 25 connected to a bevel pinion 26. The unit including the two pinions 25 and 26 is freely mounted on a spindle 27 and forms part of a differential comprising another bevel pinion 28, keyed to the shaft 27, and planet wheels 29 carried by a pinion 30. The latter meshes with a wheel 31 mounted concentrically with the axis of the spindle and rigidly connected with the supporting shank 6 of the surfacing plate.

On the end of the shaft 27 is attached a toothed wheel 32 which meshes with a pinion 33 at the end of a spindle A14 leaving from the feed casing of the carriage.

If this spindle A14 is stationary, that is to say if the feeding mechanism is not thrown into gear, the gear 28 is also stationary. The wheel 31 turning with the plate drives the pinion 30 and the planet-gears 29 rotate round the gear 28; the gears 26, 25 turn at double the speed of the gear 30, but the gear ratios are such that at this instant the loose wheel 24 does not move with reference to the wheel 31. Consequently, the pinion 23 is not driven and the slide CS remains stationary.

If on the other hand, the feeding mechanism is thrown into gear, the spindle A14 causes the bevel pinion 28 to turn, that gives rise to a relative motion of the freely mounted wheel 24 with respect to the wheel 31. The pinion 23 is actuated, and moves the slide CS. From the above explanation, it will be observed that the casing BP of the surfacing plate includes all the parts required for its operation, that is to say on the one hand the gear effecting the rotation thereof and on the other hand the gear controlling the feeding mechanism of the slide bar. This casing is constructed so as to be fitted easily to the carriage casing C, as disclosed plainly in Figure 2. In addition, these mechanical parts are arranged so that they may be actuated by one of the driving spindles and one of the spindles of the feeding mechanism of the spindle carrying carriage.

The operation of the machine is as follows:

The article on which the work is to be performed by the machine of my present invention is mounted on the table shown in dotted lines in Fig. 1. This table can then be located in proper relation to the cutting tools, as is well known in the art. The machine tool structure described herein is of the type where the work remains stationary while the cutting tool moves with respect thereto.

The elements described above are adapted to perform various operations. The machine can drill, bore and surface or plane. When the machine is used for drilling, the drilling tool is mounted on the end of spindle B and the spindle is rotated and advanced to advance the drill into the article being worked on. As has been described above, the spindle B is connected to sleeve 1 by means of splines so that the spindle B must rotate with sleeve 1 but is enabled to advance with respect thereto.

When it is desired to use the machine for boring, one or more cutting tools are mounted on a bar which is integral with spindle B. This can be done in known ways, and any suitable boring bar construction would serve the purpose. In this operation of the machine for boring, the spindle B is rotated and advanced in the same way as for the drilling described above. The construction of spindles used in drilling and boring are very well known in the machine tool art. The details of the construction of spindle B which enable it to support the cutting tools for drilling and boring form no part of my present invention.

When it is desired to use the machine for planing or surfacing, a cutting tool is mounted on slide bar CS on the face of surfacing plate PS. Here also the article being machined remains stationary and the tool mounted on slide bar CS is fed radially with respect to surfacing plate PS, as the said plate rotates, whereby the cutting tool describes a spiral over the surface of the article being machined and thereby removes the necessary amount of material.

From the above description it is evident that the spindle B must be actuated when the machine is used for drilling or boring, and that the surfacing plate PS and slide bar CS must be actuated when the machine is used for surfacing or planing. The spindle B may be moved to the right from its position shown in Fig. 4, since it is slidably mounted by its splines within the sleeve 1, if it is found that the left end of spindle B, as viewed in Fig. 4, interferes with the mounting or operation of the tool fixed to slide bar CS.

In order to drive the machine properly for the above described operations, the following gear combinations are provided:

When the machine is to be used for drilling or boring it is only necessary to rotate the spindle B, and this rotation is obtained by shifting the speed change gear 53 on the shaft 50 so that it meshes with either one of the gears 55 mounted on shaft 56. In this way the drive from the motor M is transmitted to the pinion 57 which is in mesh with the gear 5 on the outer surface of sleeve 1, as is clearly shown in Fig. 4, and in this manner sleeve 1 is rotated so as to also rotate spindle B which is connected by splines to sleeve 1. In this way the drive from the motor M is transmitted to the cutting tools mounted on the spindle B when the machine is used for drilling or boring. It will be noted that all the parts of Fig. 4 not mentioned in this paragraph are idle when the machine is used for boring or drilling.

When the machine is used for planing or surfacing, the handle mp is rotated in a counter-clockwise direction, as viewed in Fig. 4, so as to shift the cup 14 in the direction of the arrow s1, shown in Fig. 4, so as to engage the inner teeth on cup 14 with the gear 15 on the end of shaft A15. The speed change gear 54 is then moved along shaft A15 so that it meshes with either of pinions 52 mounted on the shaft 50, whereby the drive from the motor M is transmitted to the pinion 12 and the inner annular gear 11 so as to rotate the surfacing plate PS. It is then necessary to transmit the drive from the motor M to slide bar CS. This is done by shifting speed change gear 62 so that it meshes with either of gears 59 or 61, and by shifting speed change gear 53 so that it meshes with either of the gears 55 on shaft 56. It will be noted that on the right hand end of shaft 56, as viewed in Fig. 4, is located a pinion 58 which drives the gear 59. Through these connections the drive of the motor M is transferred to a shaft A14 so that pinion 33 drives gear 32 and the drive is then transmitted, in the manner described above, to gear 24, which is loosely mounted, so as to move gear 24 with respect to gear 31, whereby gear 23 is rotated so as to actuate pinion 18. As described above, the pinion 18 operates rack 17c which is rigidly connected to the slide bar CS so as to feed the slide bar radially of the surfacing plate PS. If it is desired to maintain the spindle B stationary during the use of the machine for planing or surfacing, the gear 57 may be shifted to the right as viewed in Fig. 4 so as to cut off the transmission of the drive from motor M to the sleeve 1.

Since the gear actuating the surfacing plate and effecting the working of its feed mechanism are thus located in the casing BP, if the surfacing plate is taken off, the carriage is free of all the parts connected with the latter and is correspondingly lightened and in a simpler form. In addition, there is the extra advantage of a greater working space being available.

All the constructional details of course, may be modified in every case without unduly extending the principle of the invention.

What I claim is:

1. In a machine tool in combination a stationary machine part; a tool carrying spindle mounted on said stationary machine part projecting therefrom; a removable casing mounted on said projecting tool carrying spindle removably in axial direction thereof, but not turnably relative to said spindle; a surfacing plate freely rotatably mounted on said removable casing coaxially with said tool carrying spindle; means for rotating said surfacing plate mounted within said removable casing and adapted to engage said surfacing plate so as to rotate the same; first driving means mounted on said stationary machine part and adapted to engage said means for rotating said surfacing plate when said removable casing is mounted on said projecting tool carrying spindle so as to be adapted to drive said means for rotating said surfacing plate; a slide member mounted on said surfacing plate slidably to and fro in axial direction of said member; means for sliding said slide member relative to said surfacing plate, said means being mounted within said removable casing and adapted to engage said slide member so as to move the same; and second driving means mounted on said stationary machine part and adapted to engage said means for sliding said slide member when said removable casing is mounted on said projecting tool carrying spindle.

2. In a machine tool equipped with a stationary machine part, a tool carrying spindle mounted on said stationary machine part projecting therefrom, first driving means mounted on said stationary machine part, and second driving means mounted also on said stationary machine part, a removable surfacing unit comprising in combination a removable casing adapted to be mounted on said projecting tool carrying spindle removably in axial direction thereof, but not turnably relative to said spindle; a surfacing plate freely rotatably mounted on said removable casing coaxially with said tool carrying spindle; means for rotating said surfacing plate mounted within said removable casing and adapted to engage said first driving means when said removable casing is mounted on said projecting tool carrying spindle; a slide member mounted on said surfacing plate slidably to and fro in axial direction of said member; and means for sliding said slide member mounted within said removable casing and adapted to engage said second driving means when said removable casing is mounted on said projecting tool carrying spindle.

3. A surfacing unit comprising in combination a casing having a front face and a rear face; a hole through said casing permitting mounting of the same on a tool carrying spindle removably in axial direction thereof; means provided on said casing for preventing turning of the same relative to said spindle when mounted thereon; a surfacing plate freely rotatably mounted on said casing adjacent to the front face thereof; a slide member mounted on said surfacing plate slidably to and fro in axial direction of said member; means for rotating said surfacing plate relative to said casing, said rotating means mounted within said casing and including a rotatable member accessible through said rear face of said casing; and means for sliding said slide member relative to said surfacing plate, said sliding means being mounted within said casing and including a rotatable member accessible through said rear face of said casing.

4. A surfacing unit comprising in combination a casing having a front face and a rear face; a hole through said casing permitting mounting of the same in a tool carrying spindle removably in axial direction thereof; means provided on said casing for preventing turning of the same relative to said spindle when mounted thereon; a surfacing plate mounted on said casing adjacent to the front face thereof freely rotatably about the axis of said hole in the same; a slide member mounted on said surfacing plate slidably to and fro in axial direction of said member; a circular row of gear teeth provided on said surfacing plate coaxially with said hole through said casing; transmission means mounted within said casing engaging at one end said row of gear teeth and accessible at the other end through said rear face of said casing; and means for sliding said slide member relative to said surfacing plate, said sliding means being mounted within said casing and including a rotatable member accessible through said rear face of said casing.

5. A surfacing unit comprising in combination a casing having a front face and a rear face; a hole through said casing permitting mounting of the same on a tool carrying spindle removably in axial direction thereof; means provided on said casing for preventing turning of the same relative to said spindle when mounted thereon; a surfacing plate freely rotatably mounted on said casing adjacent to the front face thereof; a slide member mounted on said surfacing plate slidably to and fro in axial direction of said member; means for rotating said surfacing plate relative to said casing, said rotating means mounted within said casing and including a rotatable member arranged substantially in said rear face of said casing; rack means provided on said slide member; and transmission means mounted within said casing and engaging at one end said rack means and accessible at the other end through said rear face of said casing.

6. A surfacing unit comprising in combination a casing having a front face and a rear face; a hole through said casing permitting mounting of the same in a tool carrying spindle removably in axial direction thereof; means provided on said casing for preventing turning of the same relative to said spindle when mounted thereon; a surfacing plate mounted on said casing adjacent to the front face thereof freely rotatably about the axis of said hole in the same; a slide member mounted on said surfacing plate slidably to and fro in axial direction of said member; a circular row of gear teeth provided on said surfacing plate coaxially with said hole through said casing; transmission means mounted within said casing engaging at one end said row of gear teeth and accessible at the other end through said rear face of said casing; rack means provided on said slide member; and transmission means mounted within said casing and engaging at one end said rack means and accessible at the other end through said rear face of said casing.

MARCEL PEGARD.

REFERENCES CITED

The following references are of record in the file of this patent:

UNITED STATES PATENTS

| Number | Name | Date |
|---|---|---|
| 2,269,641 | Woytych | Jan. 13, 1942 |
| 2,278,264 | Hollengreen | Mar. 31, 1942 |

FOREIGN PATENTS

| Number | Country | Date |
|---|---|---|
| 167,240 | Great Britain | July 29, 1921 |
| 212,965 | Great Britain | Mar. 17, 1924 |